United States Patent [19]

Clayton, Jr.

[11] 4,445,674

[45] May 1, 1984

[54] SHOCK ABSORBER FOR AN OIL WELL PUMPING UNIT

[76] Inventor: Donald H. Clayton, Jr., 4005 Kingswick, Arlington, Tex. 76016

[21] Appl. No.: 373,049

[22] Filed: Apr. 29, 1982

[51] Int. Cl.³ .......................... F16F 1/36; F16H 21/32; G05G 3/00

[52] U.S. Cl. .................................... 267/141; 74/41; 74/108; 267/153

[58] Field of Search ..................... 267/137, 141.1, 141, 267/141.2, 141.3, 141.4, 141.5, 141.6, 141.7, 153, 125, 140, 63, 140.3, 140.4; 74/108, 41, 581, 582, 583

[56] References Cited

U.S. PATENT DOCUMENTS

| | | | |
|---|---|---|---|
| 1,930,098 | 10/1933 | Hossfeld | 267/153 |
| 2,098,290 | 11/1937 | Hinkle et al. | 267/125 X |
| 2,711,312 | 6/1955 | Ratigan | 267/153 |
| 3,160,111 | 12/1964 | Berry | 267/125 |
| 3,363,475 | 1/1968 | Foster et al. | 267/141 X |
| 3,404,877 | 10/1968 | Darnell | 267/137 |
| 3,480,268 | 11/1969 | Fishbaugh | 267/141 |
| 4,176,714 | 12/1979 | Case | 74/581 X |
| 4,354,395 | 10/1982 | Page, Jr. | 74/41 |
| 4,354,397 | 10/1982 | Fix | 267/141 X |

*Primary Examiner*—Douglas C. Butler
*Attorney, Agent, or Firm*—Charles W. McHugh

[57] ABSTRACT

A shock absorber for the pumping unit of an oil well, adapted to be placed between the walking beam and a string of sucker rods in the borehole. The shock absorber has a tubular body of steel (or an equivalent structural material) having a closed top and an open bottom. A circular top on the tubular body has a central opening through which the polished rod is adapted to pass; and a rod clamp is affixed to the polished rod—above the tubular body. A plurality of elastomeric discs, typically four or five, are positioned in a stack within the tubular body; and each disc has an external diameter which is slightly less than the internal diameter of the tubular body. The plurality of elastomeric discs rest on top of a rigid circular plate having an OD smaller than the ID of the tubular body; and the circular plate, in turn, rests on top of a rigid spool. The spool has a central opening which is significantly larger than the diameter of the polished rod, so that there is no risk of establishing rubbing contact between the spool and the carefully machined and highly polished rod. The spool rests upon and bears against the top of the hanger bar, such that upwardly directed vertical loads on the hanger bar are passed first to the spool, then to the circular plate, and then to the elastomeric discs—which constitute the vibration damping and shock insulating elements of the shock absorber. Because of the closed top and open bottom, no water can accumulate within the shock absorber; and there is no possibility of the device "freezing up" in very cold weather.

6 Claims, 4 Drawing Figures

# SHOCK ABSORBER FOR AN OIL WELL PUMPING UNIT

BACKGROUND AND OBJECTS OF THE INVENTION

This invention relates generally to shock absorbers for oil well pumps; more specifically, it relates to a shock absorber which is interposed between the walking beam of an oil well pumping unit and the string of sucker rods which extend down into the borehole.

In oil well pumping operations, it is customary to employ a lift-type pump at the bottom of the well's borehole. The sub-surface pump is sequentially raised and lowered by the movement of a crank on top of the ground—through connection with a plurality of sucker rods that extend down into the well. A polished rod connects the top one of the string of sucker rods to a hanger bar positioned above ground level; and the hanger bar, in turn, is connected through two parallel cables to the distal end of the machine-driven crank.

It has long been known that the stress that is applied by a crank to a string of sucker rods (which may be several thousand feet long) can be very severe. And, it is not uncommon for the cyclical vibrations in the sucker rods to cause one or more them to fail after only a few weeks or months of well operation. In view of the fact that the problem has long been recognized, it is not surprising that various solutions have been tried; and certain proposals even appear in U.S. patents. Examples of U.S. patents which teach various forms of shock absorbers for use in this field include: No. 2,098,290 to Hinkle et al. entitled "Sucker Rod Impulse and Impact Damper"; No. 3,404,877 to Darnell entitled "Shock Absorber"; and No. 4,176,714 to Case entitled "Shock Absorber for Oil Well Pumping Unit." Another shock absorber has been marketed for many years by Dyna-Pak, Inc. of Florissant, Colo. The Dyna-Pak shock absorber constitutes the subject matter of application Ser. No. 148,544 filed May 9, 1980 by Paul W. Fix entitled "Sucker Rod Shock Absorber", now U.S. Pat. No. 4,354,397.

Of course, the Fix and the Case patents are the more recent ones, so it is logical that they should be describing the very latest ideas in material technology, including the use of elastomeric materials which serve to cushion shocks and damp vibrations instead of merely storing energy (as does a coil spring). However, both the Case and Fix shock absorbers have fundamental design characteristics that render them vulnerable to problems in the field; specifically, both the Case and the Fix shock absorbers have open tops and closed bottoms. It has been found that when such open-top devices are placed in harsh working environments, they tend to accumulate both water and dirt within their tubular canisters. In the winter time, the accumulated water from rain or snow falling on the shock absorber will often freeze within the canister, thereby converting a previously resilient shock absorber into essentially a solid block. Obviously, a frozen shock absorber has none of the benefits that could be obtained from the shock absorber in its new and freshly installed condition. Additionally, any dust and dirt which accumulates within the open-topped tubular bodies eventually serves as an abrasive to wear down the elastomeric materials which constitute the only cushioning material in an operating system. So, even though the concept of an oil well shock absorber has been in existence for well over 50 years, there has still remained a need for a reliable, simple and effective shock absorber for oil well pumping units. It is an object of this invention to provide such a shock absorber.

It is a further object to provide a shock absorber which is easily convertible so as to be used with polished rods having a diameter of 1.25 inches as well as those having a diameter of 1.50 inches.

These objects and others will be apparent from a study of the specification and the claims appended thereto, as well as reference to the attached drawings.

SUMMARY OF THE INVENTION

In brief, the shock absorber of this invention comprises a tubular body of steel (or an equivalent structural material) having a closed top and an open bottom. The circular top has a central opening through which the polished rod is adapted to pass; and, as is customary, a polished rod clamp (30 of FIG.2) is affixed to the polished rod—above said tubular body. A plurality of elastomeric discs are positioned in a stack within said tubular body; and each disc has an external diameter which is slightly less than the internal diameter of the tubular body. Thus, a certain amount of relative movement is possible between the sides of said tubular body and the edges of the elastomeric discs during the initial compression phase of the shock absorber—prior to the time that the discs become so distended that they essentially fill the entire top of the tubular body. The plurality of elastomeric discs rest on top of a circular plate; and the circular plate, in turn, rests on top of a rigid spool. The spool has a central opening which is significantly larger than the diameter of the polished rod, so that there is no risk of establishing rubbing contact between the spool and the carefully machined and highly polished rod. The spool rests upon and bears against the top of the hanger bar, such that upwardly directed vertical loads on the hanger bar are passed first to the spool, then to the circular plate, and thence to the elastomeric discs—which constitute the vibration damping and shock insulating elements of the shock absorber.

DETAILED DESCRIPTION OF THE PREFERRED EMBODIMENT

Figure 1:
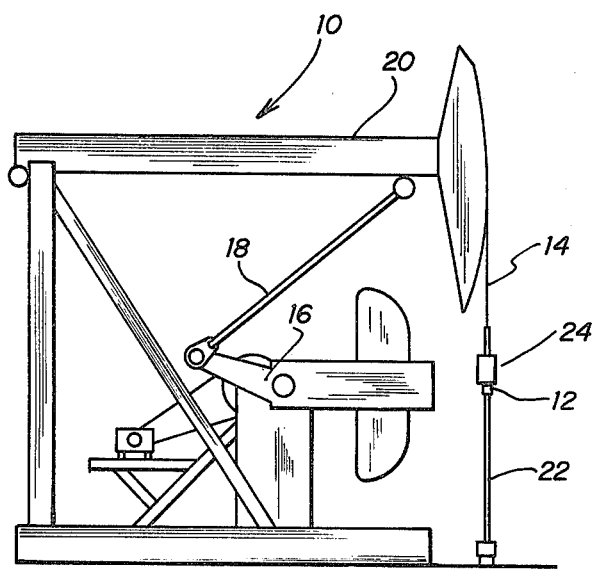
FIG. 1 is a somewhat diagrammatic representation of an oil well pumping apparatus, shown in elevation, and illustrating the environment in which the present invention is utilized.

Referring initially to FIG. 1, an oil well pumping unit 10 has a horizontal hanger bar 12 conventionally suspended by two parallel cables 14. The pumping unit 10 includes an engine 16 which causes a crank 18 to turn, thereby causing the walking beam 20 to oscillate about its support point. A polished rod 22 is connected to the top one of a series of sucker rods which extend down into the borehole of the well, where the sucker rods support a lift pump that is caused to lift a column of oil within the borehole with every cycle of the walking beam.

Figure 2:
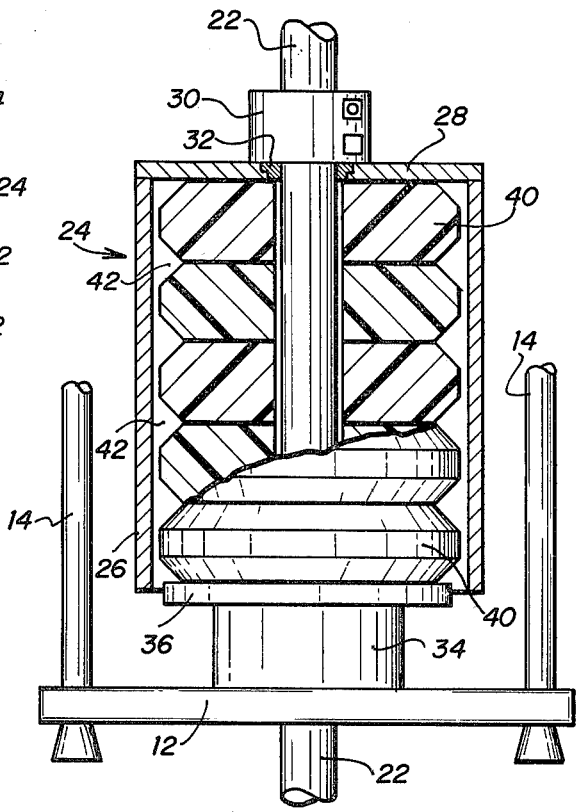
FIG. 2 is an enlarged cross-sectional view of the shock absorber of this invention, showing the condition of the shock absorber when there is no compressive load thereon—and the elastomeric discs are in their uncompressed condition.

Referring next to FIG. 2, a shock absorber 24 is interposed between the polished rod 22 and the hanger bar 12 in order to damp any oscillations that might be generated by the cyclical up and down movement of the string of sucker rods, etc. The shock absorber 24 includes a tubular body 26 which is made of steel, in order to resist the substantial forces that are typically involved in use of this device. A seamless steel tube having an OD of about 7¾ inches and a wall thickness of ⅜ inch will typically provide the requisite strength for a shock absorber in accordance with this design. However, another structural material having equivalent strength characteristics could probably be substituted for the steel body 26 without affecting operation of the shock absorber. A circular top 28 is permanently affixed to the cylindrical side walls 26, by welding, in order to close the top of the shock absorber 24; the bottom of the tubular body is left permanently open. The top 28 also has a central opening through which the polished rod is adapted to pass. Preferrably, the top opening is significantly larger than the diameter of any contemplated polished rod, i.e., larger than 1.5 inches in diameter. This large opening is then partially closed by a brass bushing 32 having an internal diameter of either 1¼ or 1½ inches, depending upon the size of the polished rod which is installed on a particular well. The bushing 32 also has a lip which fits snugly in a counterbore in the top 28, which precludes the bushing from passing downwardly into the tubular body 26. The inside of the tubular body 26 is preferably machined so as to provide a very smooth interior surface. Any welding flash or the like (such as might be present near the joint between sidewall 26 and top 28) is also machined or ground off, so as to provide a smooth surface against which a hard rubber disc could rub without suffering deleterious effects. A typical length for a tubular body 26 is about 10 inches.

Another part of the shock absorber 24 is a rigid spool 34 which may be conveniently fabricated from a piece of steel bar stock (e.g., A36 steel) having an outer diameter of about 5 inches and an inner diameter of about 2 inches. Such a rigid spool 34 having a 5-inch diameter and a length of about 4 inches will weigh approximately 20 pounds, including two brass bushings which are forced into the respective ends of the central opening of the spool. One reason for providing such a great quantity of high-strength steel in such a small space is to foster utility of the spool 34 with the various sizes of pump units that are in use in the oil fields. Some small pump units have their wire lines 14 separated by as little as six inches; and a spool diameter of five inches is about as large as can be reasonably used in order to ensure that there will always be side-wall clearance between the relatively moving parts. On the other hand, some large pumps have their cables 14 separated by twelve inches or more. With such large pump units, space is no problem in designing a spool 34, but strength is. So, it is believed to be expedient to have one size of spool 34 that is small enough to fit on small pump rigs but strong enough to work safely with large pump units. One face of the spool 34 may be referred to as the lower face, and it is configured so as to rest on top of the hanger bar 12. The other face of the spool 34 (i.e., the top face) has a configuration which permits it to bear against a circular plate 36 that is captured by the polished rod 22 but otherwise slides freely within the shock absorber 24 in an axial direction. For simplicity, and to foster wide-area contact, the top and bottom surfaces of the spool 34, as well as the top and bottom surfaces of the circular plate 36, are made flat.

The circular plate 36 is typically made of steel, and it constitutes the structural member through which axial loads are applied to a plurality of elastomeric discs 40 which are captured within the shock absorber 24. Hence, the external diameter of the circular plate 36 should be as large as practicable in order to distribute loads to the discs 40 over as wide an area as is possible. However, the circular plate 36 must not be made so large as to introduce the possibility of rubbing against the inner walls of tubular body 26. When the ID of the tubular body 26 is approximately 7 inches, an appropriate diameter for the circular plate is 6⅜ inches. An appropriate thickness for the steel plate is at least ¾ inch, so as to preclude any flexing during a pumping cycle. Also, it is preferred that the circular plate 36 be bored in order to receive a bushing of brass or an equivalent soft metal, in order to preclude damage to the machined surface of the polished steel rod 22—if there should ever be any contact between the two.

Figure 4:
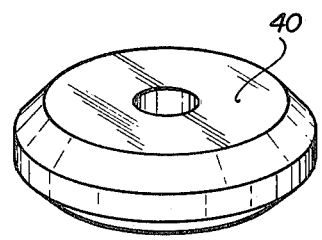
FIG. 4 is an isometric view of an elastomeric member having a configuration which is preferred for use in this invention.

Stacked on top of the circular plate 36 are a plurality of elastomeric discs 40, each of which has an axial opening which is adapted to receive the polished rod 22. Typical discs 40 are molded of a very hard, rubbery material, usually having a durometer hardness of 60, 70 or 80. Referring additionally to FIG. 4, the discs 40 have flat, smooth top and bottom surfaces which extend radially outward from a central aperture that preferably is 1½ inches in diameter; the large aperture is preferred in order that a single disc might be useable on both large and small polished rods. The top and bottom peripheral edges of the discs 40 are beveled (i.e., chamfered) at an angle of about 45°. As can be clearly seen in FIG. 2, therefore, there is an annular space 42 between two juxtaposed discs 40 in their unloaded condition—immediately adjacent the tubular body 26. The location of this annular gap 42 between two juxtaposed discs is believed to be particularly advantageous, because compression of the elastomeric discs by a great amount naturally causes this annular space to be reduced in size; and the cyclical compression of the air in said annular spaces naturally generates heat. In accordance with Applicant's construction, any heated air within the shock absorber 24 is located in the best possible place for efficient heat transfer; that is, the heated air is next to a steel member which is exposed on its outer side to the ambient air. Furthermore, the size of the annular cavities 42 is relatively large, by virtue of being at the outer limits of the discs 40, so that the surface area for heat transfer is optimized.

A preferred thickness for the elastomeric discs 40 is about 2 inches, so that a stack of four such discs can be positioned within the tubular body 26 and still leave room for the circular plate 36 to be peripherally shielded by the depending edge of tubular body 26. Placing five discs 40 in a 10-inch canister 26 will likely cause the bottom one of the unloaded discs to initially protrude slightly below the bottom edge of the canister. But, by the time that five discs are compressed to the extent that any peripheral restraint is needed, the five discs will be high enough into the canister 26 so that the restraint of the side walls will be present for all of the discs.

Figure 3:
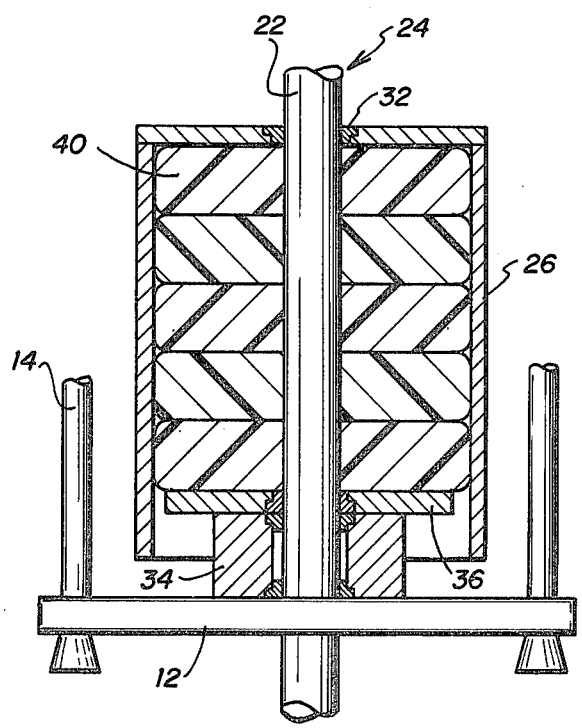
FIG. 3 is a cross-sectional view similar to FIG. 2, but showing the shock absorber in its fully compressed condition, such as when a maximum lifting force has been applied to the polished rod (and the attached sucker rods) by the upwardly moving walking beam.

Referring next to FIG. 3, the shock absorber 24 is shown in a fully compressed condition wherein the plurality of elastomeric discs 40 have become so distended that they can be said to essentially occupy all of the space in the top of the shock absorber. Such a condition can arise when a truly large lifting force is applied through the cables 14 and hanger bar 12—and a similarly large resisting force is exerted (in a downward direction) by the weight of the polished rod 22, the string of sucker rods, and the column of oil in the borehole. When the discs 40 are subjected to loads of many thousands of pounds, they behave much like hydraulic fluids, in the sense that they can be displaced but they are essentially non-compressible. Having reached a compressed condition as indicated in FIG. 3, the discs 40 cannot be further compressed; therefore, the bottom edge of the tubular body 26 is prevented from making contact with the top of the hanger bar 12. Of course, the shock absorber will spend more time in intermediate compression conditions than it will spend in the two extreme positions represented by FIGS. 2 and 3. So there is no practical risk that the steel shell 26 could ever bump into the hanger bar 12; and a resilient connection is therefore assured at all times between the engine 16 (and its associated gear box) and the string of sucker rods. Because there is no way for water to accumulate in the open-bottomed shock absorber 24, there is no risk that any water might freeze and convert this shock absorber into a block of unrelenting ice.

While only the preferred embodiment of the invention has been disclosed in detail herein, it should be apparent to those skilled in the art that modifications thereof can be made without departing from the spirit of the invention. Thus, any specific structure shown herein is intended to be exemplary and is not meant to be limiting, except as described in the claims appended hereto.

What is claimed is:

1. A shock absorber for use with an oil well pumping unit having a horizontal hanger bar suspended by cables, and there being a vertical polished rod having its lower end connected to a string of sucker rods for actuation of a pump in the borehole, and the hanger bar having an opening through which the polish rod extends, comprising:
    (a) a tubular body having a closed top and an open bottom, and the top having a central opening through which the polished rod passes;
    (b) a rigid spool having a central opening which is significantly larger than the diameter of the polished rod, such that the polished rod may pass through said central opening without any risk of establishing rubbing contact with the inner surface of said spool, and the lower face of said spool being configured so as to rest on top of the hanger bar;
    (c) a circular plate having a diameter slightly less than the internal diameter of the tubular body, and the plate having a central opening which is sufficiently large as to preclude interference with the polished rod, and the plate having an upper surface which is substantially flat and a lower surface which is configured to rest on top of the spool;
    (d) a plurality of elastomeric discs positioned in a stack within said tubular body, and each disc having an external diameter slightly less than the internal diameter of the tubular body, and each disc having an axial opening for receiving the polished rod, and the height of the stack of elastomeric discs in their uncompressed condition being approximately the same as the height of the tubular body, and the combined height of the rigid spool and the stack of compressed discs being more than the height of the tubular body when the discs are fully compressed within said tubular body, whereby the bottom edge of the tubular body is prevented from making contact with the hanger bar when a downwardly directed load is placed on the top of the tubular body by the polished rod.

2. The shock absorber as claimed in claim 1 and further including a brass bushing pressed into the central opening in the circular plate, and the inner diameter of said brass bushing having a size which closely approximates the diameter of the polished rod.

3. The shock absorber as claimed in claim 1 wherein the rigid spool has a diameter of about 5 inches and a height of about 4 inches, and said spool is made of steel weighing about 20 pounds.

4. The shock absorber as claimed in claim 1 and further including a brass bushing in the central opening in the tubular body, and said bushing having an upper lip which prevents the bushing from passing downwardly into the tubular body.

5. The shock absorber as claimed in claim 1 wherein the top and bottom surfaces of said rigid spool are flat, whereby the spool may make contact with the hanger bar over a substantial area, and the spool may also make contact with the circular plate over a wide area.

6. The shock absorber as claimed in claim 1 wherein the rigid spool has a central bore whose diameter is about 2 inches, and said central bore is capped at both of its ends with a soft metallic bushing, and the inner diameter of said two bushings being dimensioned to accommodate a given sized polished rod.

* * * * *